UNITED STATES PATENT OFFICE.

JOSEPH FLACHSLAENDER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

GREEN SULFUR DYE.

1,113,766.      Specification of Letters Patent.      Patented Oct. 13, 1914.

No Drawing.      Application filed August 9, 1911. Serial No. 643,190.

*To all whom it may concern:*

Be it known that I, JOSEPH FLACHSLAENDER, doctor of philosophy, chemist, citizen of the German Empire, residing at Elberfeld, Germany, have invented new and useful Improvements in Green Sulfur Dye, of which the following is a specification.

My invention relates to the manufacture and production of new green sulfur colors which are obtained by treating with alkali polysulfids and copper or copper compounds the leucoindophenols containing the nucleus

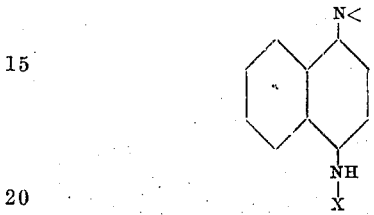

in which the amino group is substituted by at least one alkyl group, the other substituent being H, alkyl or aryl, and X=the radical of a simple or substituted phenol or their leuco compounds produced by joint oxidation of mono- or dialkyl-1-naphthylamins, (such as mono- or dimethyl- or diethylnaphthylamin) and para-aminophenol (or its substitution products, such as para-aminocresol, para-amino-chloro-phenols).

The new dyes contain copper and are after being dried and pulverized black powders soluble in a solution of sodium sulfid generally with a green coloration and in concentrated sulfuric acid generally with a bluish coloration. They are distinguished by their good solubility and they produce pure green shades fast to boiling.

In order to illustrate the new process more fully the following example is given, the parts being by weight:—34.7 parts of the leucoindophenol having the following formula:

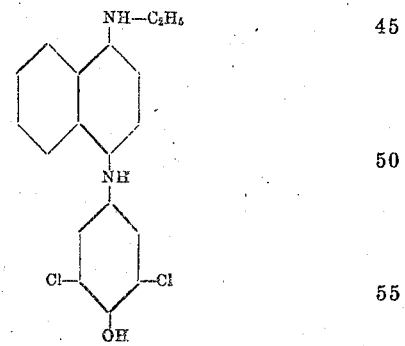

obtained from monoethyl-1-naphthylamin and 2.6-dichloro-4-amino-1-phenol are added to a solution of 32 parts of sulfur and 136 parts of crystalline sodium sulfid and after the addition of 7 parts of $CuSO_4$ the mixture is heated to about 105° C. until the parent material has disappeared. The melt can be directly dried or subjected to purification. The dyestuff thus obtained contains copper and is after being dried and pulverized a black powder soluble in a sodium sulfid solution with a green coloration. It is soluble in concentrated sulfuric acid and in hot caustic soda lye (30° Bé.) with a greenish-blue coloration and dyes cotton in pure green shades. The above mentioned quantities of sodium sulfid and of sulfur as well as the temperature and the duration of the reaction can be varied within wide limits. Similar dyestuffs are obtained by using other of the above mentioned leuco compounds.

I claim:—

1. The hereinbefore described new sulfur dyes obtained from leucoindophenols, containing the nucleus:

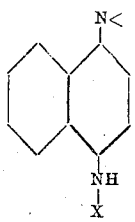

in which the amino group is substituted by at least one alkyl group, and in which X represents a phenolic radical which contain copper and are after being dried and pulverized black powders being soluble in a solution of sodium sulfid generally with a green coloration being soluble in concentrated sulfuric acid generally with a bluish coloration; and dyeing unmordanted cotton green shades, substantially as described.

2. The hereinbefore described new sulfur dyes obtained from leucoindophenols containing the nucleus,

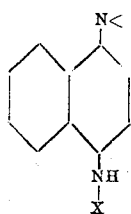

in which the amino group is a mono-alkyl substituted amino group, and X represents a phenolic radical, which are after being dried and pulverized black powders being soluble in a solution of sodium sulfid generally with a green coloration being soluble in concentrated sulfuric acid generally with a bluish coloration; and dyeing unmordanted cotton green shades, substantially as described.

3. The hereinbefore described new sulfur dye obtained from leucoindophenol of the formula:

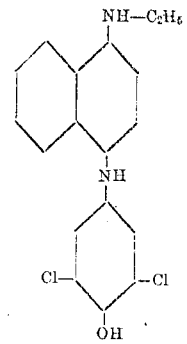

which contains copper and is after being dried and pulverized a black powder soluble in a sodium sulfid solution with a green coloration and soluble in concentrated sulfuric acid and in caustic soda lye (30° Bé.) with a greenish-blue coloration; dyeing unmordanted cotton in pure green shades, substantially as described.

In testimony whereof I have hereunto set my hand in the presence of two subscribing witnesses.

JOSEPH FLACHSLAENDER. [L. S.]

Witnesses:
CHAS. J. WRIGHT,
ALBERT F. NUFER.